United States Patent [19]

Kobayashi

[11] Patent Number: 5,098,351

[45] Date of Patent: Mar. 24, 1992

[54] TORQUE DISTRIBUTION CONTROL SYSTEM FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 541,704

[22] Filed: Jun. 21, 1990

[30] Foreign Application Priority Data

Jul. 20, 1989 [JP] Japan .................. 1-189998

[51] Int. Cl.⁵ .................................. B60K 17/34
[52] U.S. Cl. ............................ 475/86; 475/221; 475/249; 180/248; 180/249
[58] Field of Search .......... 475/221, 248, 249, 84, 475/86; 180/248, 249, 250

[56] References Cited

U.S. PATENT DOCUMENTS

| | | | |
|---|---|---|---|
| 4,417,642 | 11/1983 | Suzuki et al. | 475/221 X |
| 4,476,952 | 10/1984 | Suzuki | 475/221 X |
| 4,700,800 | 10/1987 | Friedrich et al. | 475/221 X |
| 4,712,448 | 12/1987 | Lanzer | 475/249 X |
| 4,779,699 | 10/1988 | Hatano | 475/249 X |
| 4,825,368 | 4/1989 | Itoh et al. | 180/249 X |
| 4,840,247 | 6/1989 | Kashihara et al. | 180/249 |
| 4,860,208 | 8/1989 | Bantle | 180/248 X |
| 4,866,625 | 9/1989 | Kawamoto et al. | 180/249 X |
| 4,875,978 | 10/1989 | Hiketa | 180/249 |
| 4,889,204 | 12/1989 | Furuya et al. | 180/248 X |
| 4,912,639 | 3/1990 | Kawamoto et al. | 180/248 X |
| 4,969,532 | 11/1990 | Oyama et al. | 180/248 |
| 4,974,696 | 12/1990 | Miyajima et al. | 475/86 X |

FOREIGN PATENT DOCUMENTS 63-176728 7/1988 Japan .

Primary Examiner—Leslie A. Braun
Assistant Examiner—Matthew Stavish
Attorney, Agent, or Firm—Martin A. Farber

[57] ABSTRACT

A central differential comprising a planetary gear device is parallel to front axles of a motor vehicle, and coaxially to a transfer shaft of a transfer device. The planetary gear device comprises a first sun gear connected to an output shaft of a transmission, a carrier, first and second planetary pinions integral with each other and rotatably supported on the carrier, and a second sun gear. The first planetary pinion is engaged with the first sun gear, and the second planetary pinion is engaged with the second sun gear. A fluid operated multiple-disk clutch is disposed coaxial to the central differential so as to restrict the differential operation of the planetary gear device.

13 Claims, 9 Drawing Sheets

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential, and more particularly to the torque distribution control system of a vehicle with a laterally mounted engine.

In a four-wheel drive motor vehicle, the torque distribution ratio between front wheels and rear wheels of the vehicle is determined to coincide with a dynamic weight ratio of the front and rear wheels, so that power of the engine is effectively used at acceleration.

In the four-wheel drive motor vehicle based on a front-wheel drive with a front-mounted engine which has the static weight ratio of 60 (front):40 (rear), the ratio of the front torque $T_F$ to the front wheels and rear torque $T_R$ to the rear wheels is determined in the ratio of 50:50 which is the same as the dynamic weight ratio thereof. In the four-wheel drive motor vehicle based on a rear-wheel drive with a front-mounted engine which has the static weight ratio of 50:50, the ratio of the front torque $T_F$ and the rear torque is determined 40:60 in the same ratio as the dynamic weight ratio. Accordingly, a central differential comprising bevel gears is employed in the former vehicle in which an output torque of the engine is equally distributed, and the central differential having a simple planetary gear device is employed in the latter vehicle.

The former vehicle ensures safe driving on a slippery road. If a differential lock device is provided for locking the central differential, the driving force of the vehicle is improved further. However, steering ability of the vehicle is not particularly improved. That is, when the vehicle makes a turn at high speed under the differential lock condition, all the four wheels may slip (slipping spin) at the same time, causing difficulty in driving.

In order to ensure driving stability of the vehicle, the torque to the rear wheels is set to a larger value than that to the front wheels by arranging the central differential comprising the simple planetary gear device, so that the rear wheels may slip first. Thus, the vehicle can be safely driven by the front wheels at a small torque while the rear wheels idle.

Japanese Patent Application Laid-Open 63-176728 discloses a four-wheel drive motor vehicle in which a central differential comprising a simple planetary gear device is provided. An output of a transmission is transmitted to a carrier of the planetary gear device. The torque is distributed to the front wheels through either a sun gear or a ring gear and to the rear wheels through the other gear. The torque to the front and rear wheels is unequally distributed at the ratio determined by the difference between the pitch circles of the sun gear and the ring gear. A fluid-operated multiple-disk friction clutch as a lock device is provided for controlling the differential operation. A standard torque distribution ratio determined by the ratio of the pitch circles can not be changed, unless the diameters of the sun gear and the ring gear change.

In order to increase the standard torque distribution ratio, the diameter of the sun gear is decreased or that of the ring gear is increased. However, in a power transmitting system where an axle differential for front or rear axles and the central differential are coaxially disposed, a plurality of shafts such as axles, a front drive shaft, an input shaft connected to the transmission and a rear drive shaft are disposed so as to penetrate the sun gear. Therefore, the diameter of the sun gear cannot be decreased. On the other hand, the ring gear cannot be large because of a limitation of space and of the required gear ratio. Consequently, the power transmitting system cannot be applied to various vehicles having different static weight ratios, such as a front-wheel drive vehicle with a front-mounted engine, a rear-wheel drive vehicle with a rear-mounted and a mid-shipped engine.

Moreover, since the distribution of the torque to the rear wheels can not be set to a large value, the control range of the multiple-disk friction clutch becomes small. Consequently, a motor vehicle having good driveability and steering ability can not be provided.

In a four-wheel drive vehicle having a laterally mounted engine, the central differential and the fluid-operated multiple disk clutch are usually coaxially disposed with the front axle differential, as is in the prior art, thereby rendering the system compact. In addition, the same parts can be used for both transaxles of a two-drive wheel vehicle and a four-wheel drive vehicle. However, such an arrangement inevitably cannot be freely modified into variant designs. Moreover, since a large torque at the final gear is directly transmitted to the central differential, the central differential must be sufficiently rigid and durable. In addition, in a power transmission system where the engine is laterally mounted, a transfer device for changing the direction of the power train must be provided, so that the system must be arranged taking into the account of the space and the strength thereof.

SUMMARY OF THE INVENTION

An object of the present invention is to provide a torque distribution control system for a four-wheel drive motor vehicle having a laterally mounted engine, in which a standard torque ratio of the front wheels and rear wheels can be easily changed.

Another object of the invention is to provide a system in which a central differential and a fluid operated multiple-disk clutch are preferably arranged with stiffness thereof.

Other objects and features of this invention will become understood from the following description with reference to the accompanying drawings.

DETAILED DESCRIPTION OF THE PREFERRED EMBODIMENTS

Figure 1A:
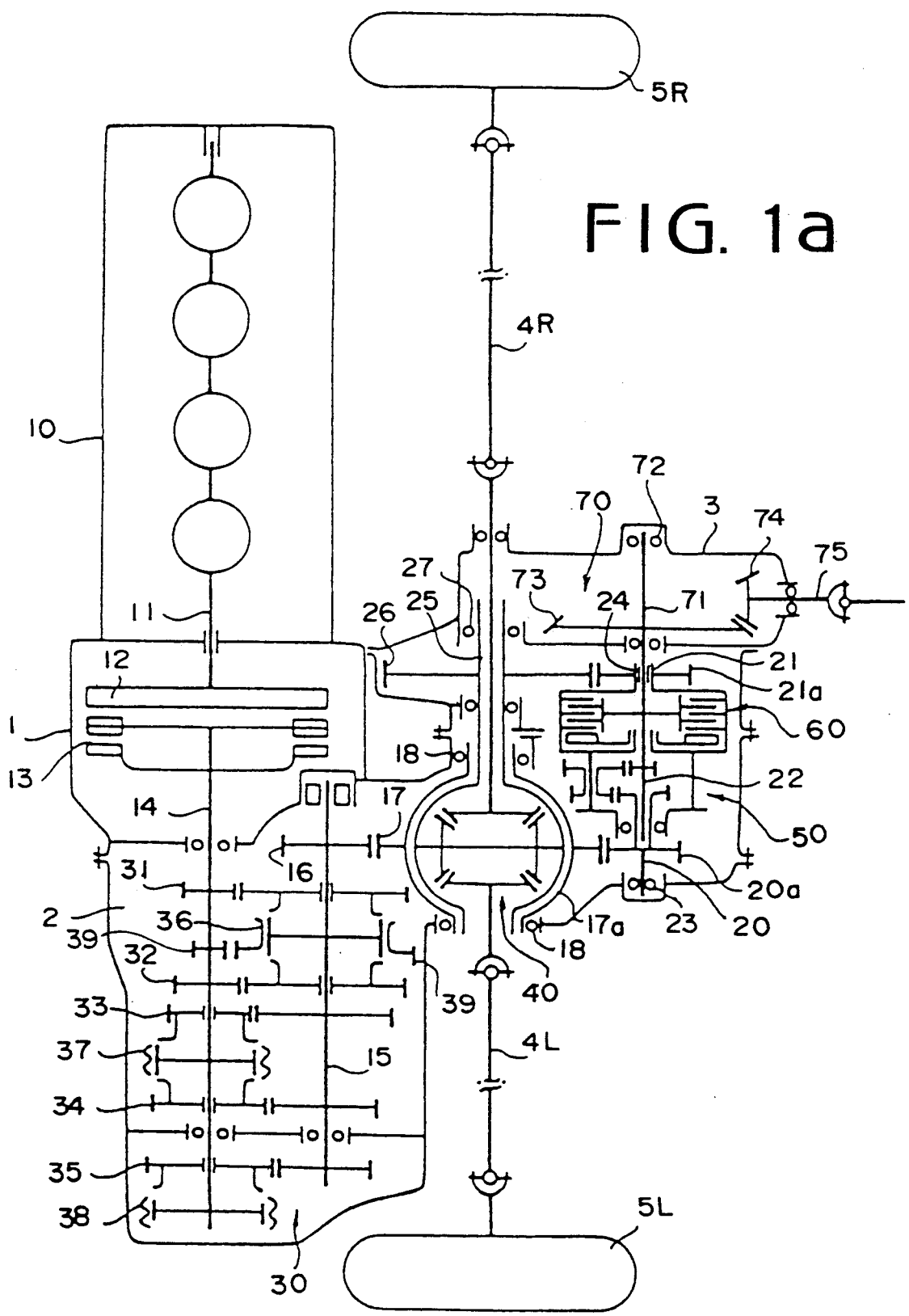
FIGS. 1a and 1b show a schematic diagram of a power transmission system for a four-wheel drive motor vehicle according to the present invention.
Figure 1B:
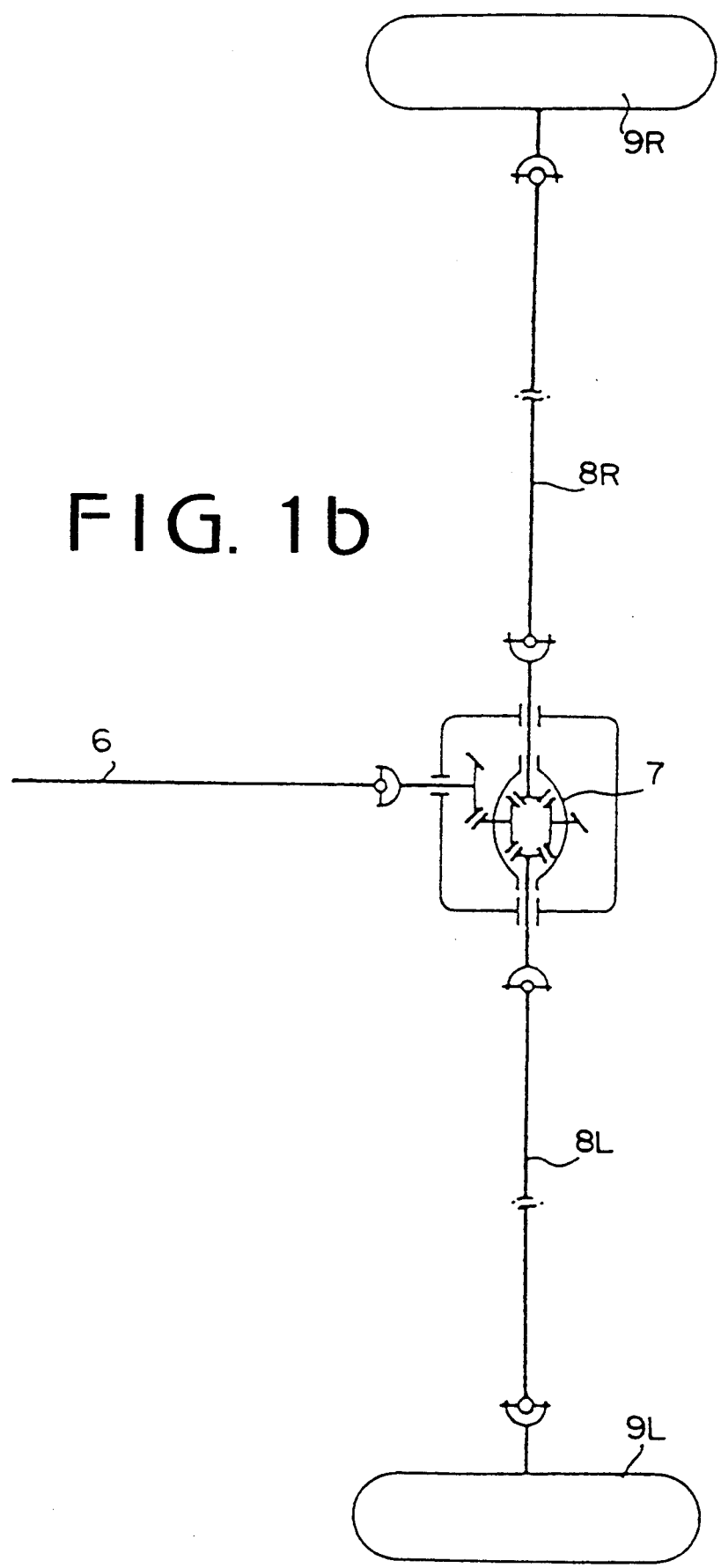

FIGS. 1a, 1b, 2a and 2b show a power transmission system for a four-wheel drive motor vehicle to which the present invention is applied. An engine 10 is laterally mounted on the motor vehicle at a right front portion thereof. The power transmission system comprises a clutch 13 connected to the engine 10 through a crankshaft 11 and a flywheel 12 and housed in a clutch housing 1, a manual transmission 30 and a front axle differential 40 housed in a transmission case 2 and a transfer device 70, a central differential 50 and a fluid-operated multiple-disk clutch 60 housed in a transfer case 3 which is attached to the clutch housing 1 offset therefrom toward the engine 10. The transmission 30 has an input shaft 14, an output shaft 15 parallel with the input shaft 14, five pairs of change-speed gears 31 to 35 corresponding to first to fifth (overdrive) speed gears, and synchronizers 36 to 38. The synchronizers 36 to 38 are disposed between the gears 31 and 32, between the gears 33 and 34 and adjacent the gears 35, respectively. A reverse drive gear 39 mounted on the input shaft 14 meshes with a gear formed on one side of a sleeve of the synchronizer 36 through an idler gear (not shown) for reverse drive.

A drive gear 16 fixedly mounted on the output shaft 15 meshes with a final gear 17 which is fixed to flanges of opposed hub members 17a by bolts (FIG. 2a) at an inner periphery of the gear 17. The hub member 17a is rotatably supported in the clutch housing 1 and the transmission case 2 through bearings 18. The front axle differential 40 is disposed inside the hub members 17a.

Figure 2A:
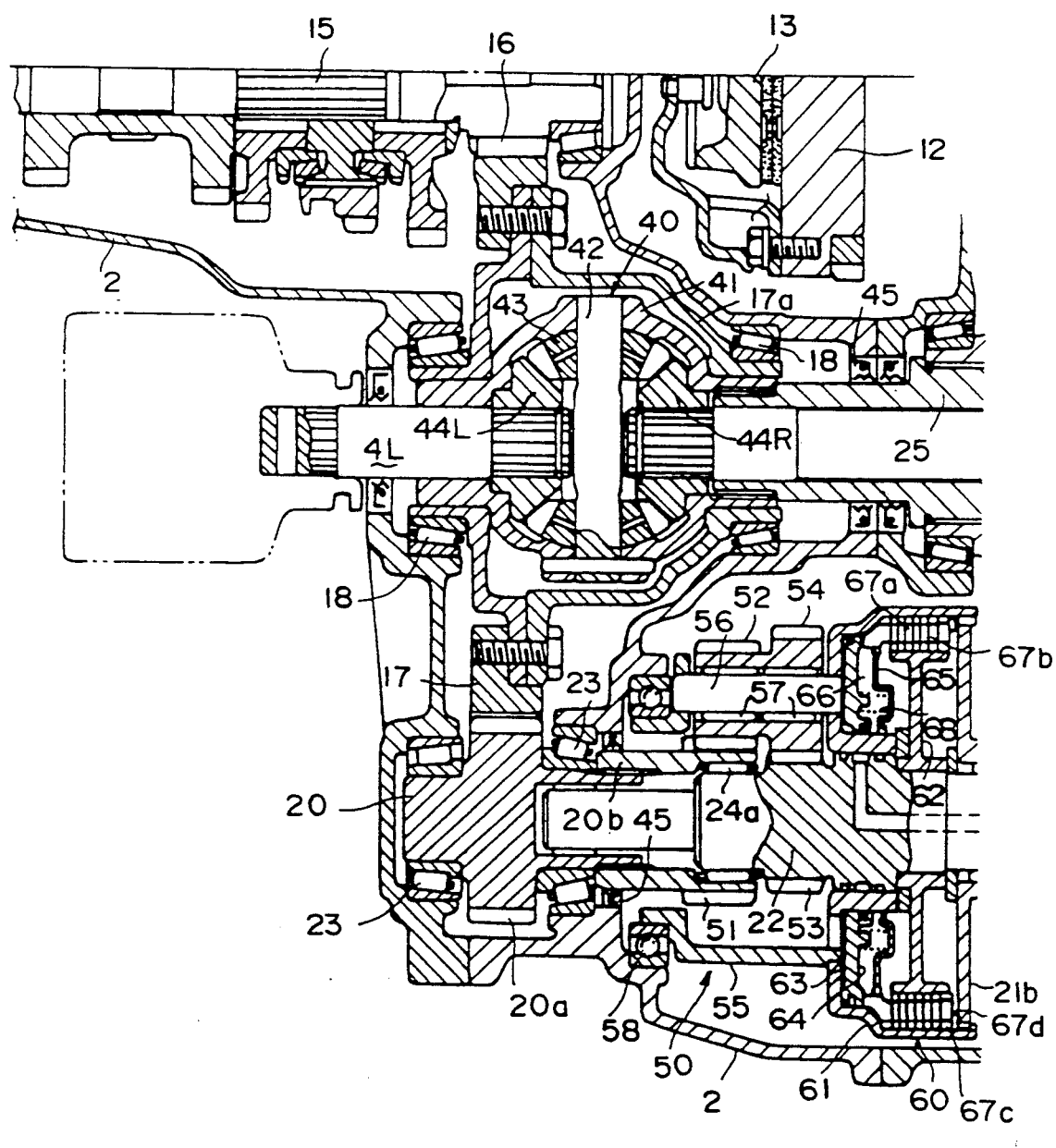
FIGS. 2a and 2b show an enlarged sectional view of a central differential of the system.
Figure 2B:
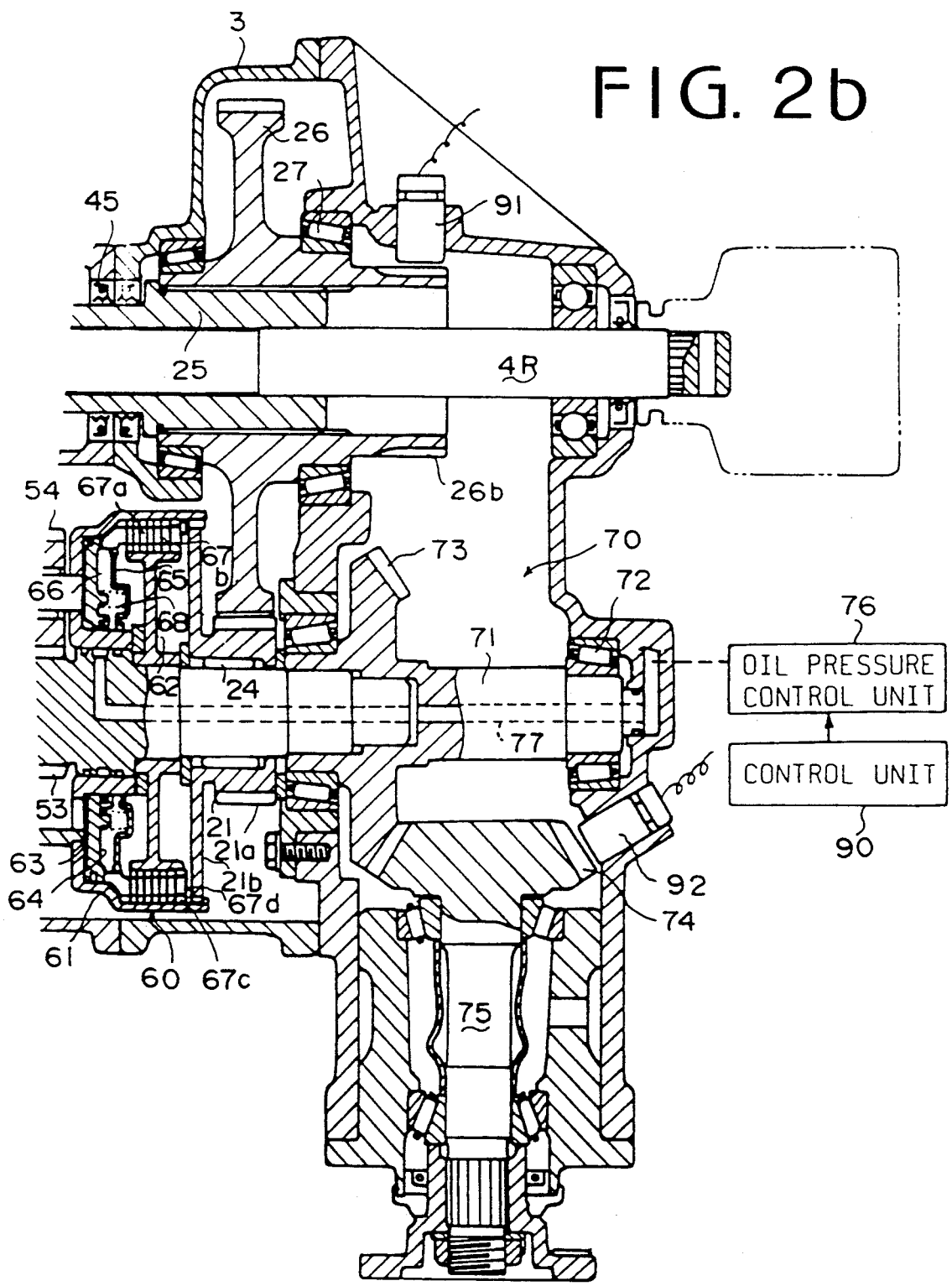

As shown in FIGS. 2a and 2b, the bevel gear front axle differential 40 has a differential case 41 connected to a first tubular shaft 25 which is rotatably mounted on a right front axle 4R. In the differential case 41, there are provided a pinion shaft 42 secured to the differential case 41, two differential pinions 43 rotatably mounted on the pinion shaft 42 and two bevel side gears 44L, 44R meshed with pinions 42. The side gears 44L and 44R are connected to left and right front axles 4L and 4R so as to respectively transmit the output power of the transmission to the left and right front wheels 5L and 5R and to absorb the difference of speeds therebetween.

The final gear 17 further meshes with a gear 20a formed on an input shaft 20 of the central differential 50. The input shaft 20 is disposed in parallel to the front axles 4L and 4R and rotatably mounted in the transmission case 2 through bearings 23. A first output shaft 22 and a transfer shaft 71 of a transfer device 70 are coaxially disposed with the input shaft 20. An end portion of the first output shaft 22 is rotatably mounted in a cylindrical portion of the input shaft 20 and the other end portion of the output shaft 22 is securely mounted in a bore of the transfer shaft 71 with splines. The transfer shaft 71 is rotatably mounted in a transfer case 3 through bearings 72. A second output shaft 21 is rotatably mounted on the first output shaft 22 through a needle bearing 24. The central differential 50 and the fluid-operated multiple-disk clutch 60 are mounted on the first output shaft 22 and hence they are disposed in parallel with the front axles 4L, 4R.

The central differential 50 is a complex planetary gear device. The input shaft 20 has a sleeve 20b which is securely mounted thereon and is rotatably mounted on the first output shaft 22 through a needle bearing 24a. The central differential 50 comprises a first sun gear 51 formed on the sleeve 20b, three first planetary pinions 52 meshed with the first sun gear 51, a second sun gear 53 formed on the first output shaft 22, three second planetary pinions 54 meshed with the second sun gear 53, and a carrier 55.

Figure 3:
FIG. 3 is a perspective view showing a carrier and pinions provided in the central differential.

Referring to FIG. 3, the carrier 55 has a boss 55a, and annular flange portions 55b and 55c. Each of the flange portions 55b and 55c has three holes. Corresponding holes rotatably support a pin 56. The pinions 52 and 54 are integral with each other and rotatably mounted on the pin 56 through needle bearings 57. The boss 55a is rotatably mounted in the transmission case 2 through a bearing 58. The flange portion 55c is connected with a drive drum 61 of the clutch 60.

Thus, the output torque from the output shaft 15 of the transmission 30 is transmitted to the first sun gear 51 through the drive gear 16, the final gear 17 and the input shaft 20 and further to the carrier 55 and the second sun gear 53 through the pinions 52, 54 at predetermined respective torque distribution ratios. The difference of rotating speeds between the carrier 55 and the second sun gear 53 is absorbed by rotation of the first and second planetary pinions 52 and 54.

Figure 4:
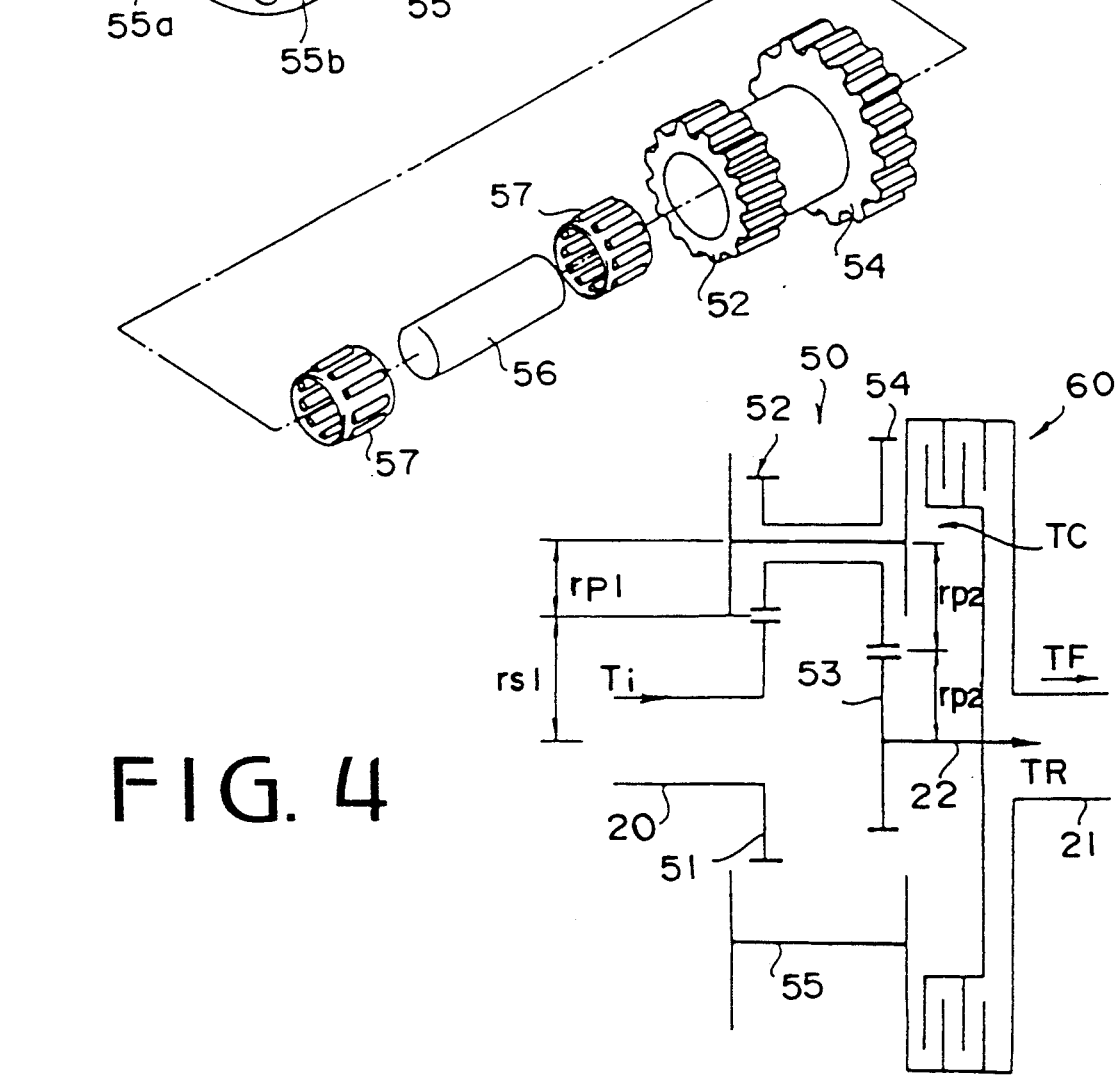
FIG. 4 is a schematic view showing the central differential.

The operation of the central differential 50 for distributing the torque to the front wheels and the rear wheels will be described hereinafter with reference to FIG. 4.

An input torque Ti of the first sun gear 51 and the relationship between the sun gears and the pinions are expressed as follows, respectively.

$$T_i = T_F + T_R \tag{1}$$

$$r_{s1} + r_{p1} = r_{s2} + r_{p2} \tag{2}$$

where $T_F$ is the front torque transmitted from the carrier 55 to the first output shaft 21, $T_R$ is the rear torque transmitted from the second sun gear 53 to the second output shaft 21, $r_{s1}$ is the radius of the pitch circle of the first sun gear 51, $r_{p1}$ and $r_{p2}$ are radii of pitch circles of the first and second pinions 52 and 54, respectively, and $r_{s2}$ is the radius of the pitch circle of the second sun gear 53.

A tangential load P on the engaging point of the first sun gear 51 and the first pinion 52 is equal to the sum of a tangential load $P_1$ on the carrier 55 and a tangential load $P_2$ on the engaging point of the second sun gear 53 and the second pinion 54. That is, $$P = T_i / r_{s1}$$

$$P_1 = T_F / (r_{s1} + r_{p1})$$

$$P_2 = T_R / r_{s2}$$

$$T_i / r_{s1} = \{(T_F / (r_{s1} + r_{p1})) + T_R / r_{s2}\} \tag{3}$$

Substituting equations (1) and (2) for the equation (3), $$T_F = (1 - r_{p1} \cdot r_{s2} / r_{s1} \cdot r_{p2}) \cdot T_i$$

$$T_R = (r_{p1} \cdot r_{s2} / r_{s1} \cdot r_{p2}) \cdot T_i$$

Consequently, it will be seen that the torque distribution for the front torque $T_F$ and the rear torque $T_R$ can be set to various values by changing the radii of the pitch circles of the sun gears 51 and 53 and the pinions 52 and 54.

If $r_{s1}$ is 23.5 mm, $rp_1$ is 16.5 mm, $rp_2$ is 18.8 mm and $r_{s2}$ is 21.1 mm, the front torque $T_F$ and the rear torque $T_R$ are calculated as $$T_F = 20/53 \cdot T_i$$

$$T_R = 33/53 \cdot T_i$$

Thus, the torque distribution ratio of the front wheels 5L, 5R and the rear wheels 9L, 9R is $$T_F:T_R \approx 38:62$$

A large torque can be distributed to the rear wheels 9L, 9R.

The clutch 60 comprises the drive drum 61 secured on the carrier 55 of the central differential 50, a driven drum 62 splined to the first output shaft 22, a plurality of disks 67a splined on the drum 61, and a plurality of disks 67b splined on the drum 62, alternately arranged. A retainer 67c is abutted on the innermost disk 67a by a snap ring 67d secured to the drum 61. A piston 64 is provided in the drum 61 and slidably mounted on a hub of the drum 61. An oil chamber 63 is formed between the piston 64 and the drum 61. A flange portion 21b of the second output shaft 21 is splined on the inner periphery of the drive drum 61 at the opening end. A gear 21a formed on the second output shaft 21 meshes with a gear 26 securely mounted on the shaft 25. The gear 26 has a large diameter and is rotatably mounted in the transfer case 3 through bearings 27. Thus, the clutch 60 is provided between the carrier 55 and the second sun gear 53 so as to change the torque distribution ratio and to lock the central differential 50.

When oil is supplied to the chamber 63, the piston 64 is pushed by the pressure of the oil. The piston 64 pushes the disks 67a and 67b to engage the clutch 60 for producing a clutch torque.

A cylindrical retainer 65 is disposed in a space between the piston 64 and the driven drum 62. The retainer 65 is mounted on the hub of the drum 61 and slidably engaged with an inner periphery of the piston 64. Thus, the retainer 65 is watertightly (sealingly) mounted between the drum 62 and the piston 64, thereby defining a centrifugal oil pressure chamber 66, opposite to the oil chamber 63. A return coil spring 68 is provided in the chamber 66 between the piston 64 and the retainer 65, thereby cancelling centrifugal force exerted on the piston 64 upon rotation of the drum 62.

The oil for the transmission 30 is different from the oil for the clutch 60. Thus, oil seals 45 are disposed between the clutch housing 1 and the shaft 25 and between the transfer case 3 and the sleeve 20b of the input shaft 20 to separate the oil for lubricating the transmission 30 from the oil for operating the clutch 60.

An oil pump 78 (FIG. 5) is provided on the transfer case 3 for supplying oil to the oil chamber 63 of the clutch 60 through an oil passage 77 formed in the transfer shaft 71 and the first output shaft 22. The oil pump 78 is driven by a motor and connected to an oil pressure control unit 76 provided in the transfer case 3 to be applied with electric pulses from a control unit 90 to control the clutch 60.

The transfer shaft 71 of the transfer device 70 is connected to a rear drive shaft 75 perpendicular to the transfer shaft 71 through a pair of bevel gears 73, 74, thereby transmitting the power to the rear wheels 9L and 9R by way of the rear drive shaft 75, a propeller shaft 6, a rear differential 7 and rear axles 8L and 8R.

Figure 5:
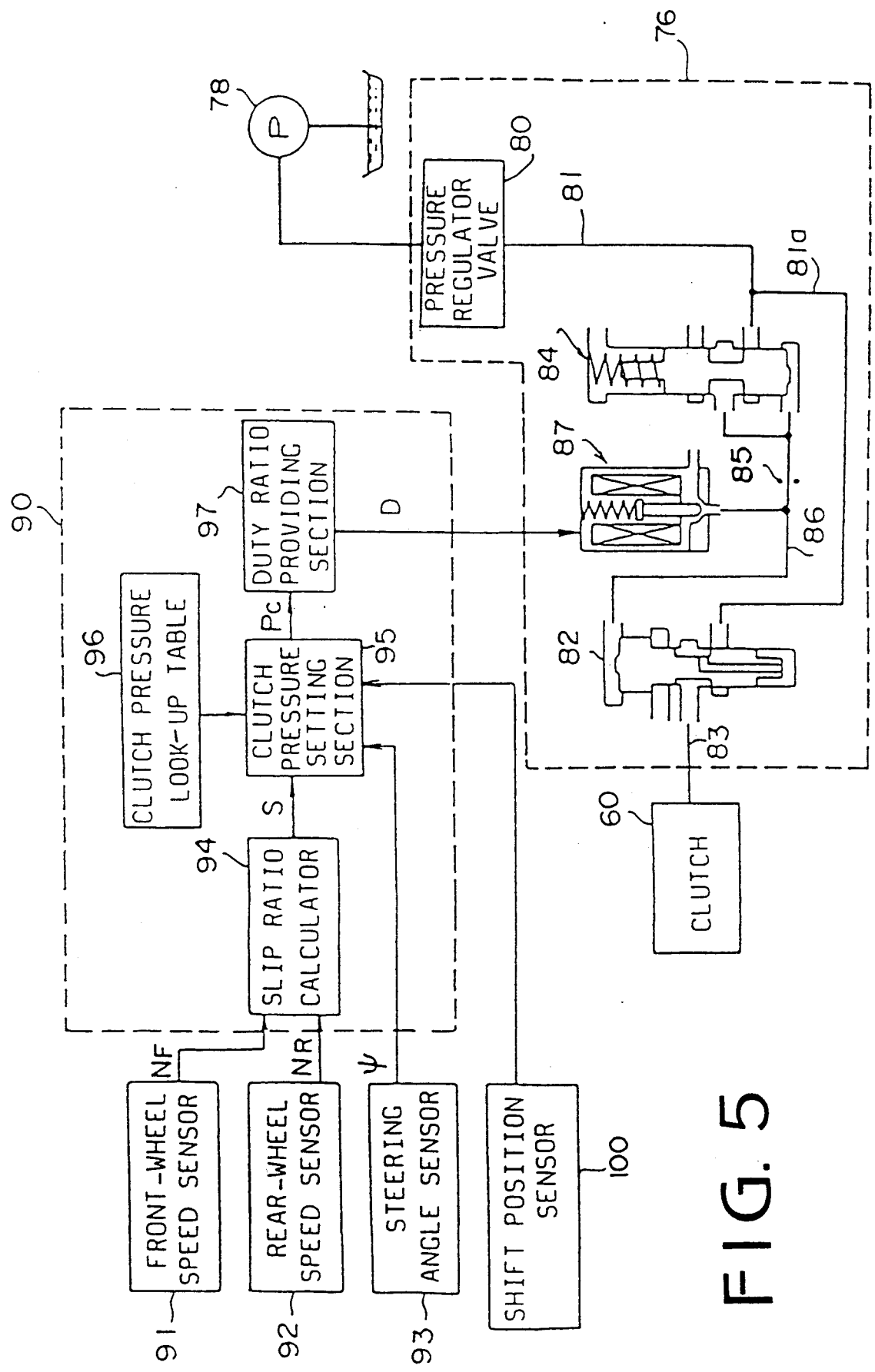
FIG. 5 is a circuit showing a control system for a hydraulic clutch provided in the central differential.

Referring to FIG. 5 showing a control system for the clutch 60, the oil pressure control unit 76 of the control system comprises a pressure regulator valve 80, a pilot valve 84, a clutch control valve 82 and a solenoid-operated duty control valve 87. The regulator valve 80 operates to regulate the pressure of oil supplied from the oil pump 78 driven by the engine 10 to produce a predetermined line pressure and a lubricating oil pressure. An actuating pressure conduit 81 is communicated with a passage 86 through the pilot valve 84. The passage 86 is communicated with the solenoid-operated duty control valve 87 downstream of an orifice 85, and with an end port of the clutch control valve 82. The conduit 81 is communicated with the clutch control valve 82 through a passage 81a. The clutch control valve 82 is communicated with the clutch 60 through the passage 83. The solenoid-operated valve 87 is operated by pulses from a control unit 90 at a duty ratio determined therein, so as to control draining the oil to provide a control pressure. The control pressure is applied to an end of a spool of the clutch control valve 82 to control the oil supplied to the clutch 60 so as to control the clutch pressure (torque).

The control unit 90 is supplied with output signals from a front-wheel speed sensor 91, a rear-wheel speed sensor 92, a steering angle sensor 93 and a shift position sensor 100 for detecting the shift position of the automatic transmission 30. As shown in FIG. 2b, the front-wheel speed sensor 91 is provided on the transfer case 3 opposite the teeth 26b formed on a hub of the gear 26 and the rear-wheel speed sensor 92 is provided opposite the bevel gear 74 formed on the rear drive shaft 75.

The control unit 90 has a slip ratio calculator 94 to which the front-wheel and rear-wheel speeds $N_F$ and $N_R$ are applied. Since the standard torque distribution is determined in accordance with the principle of $T_F < T_R$, the rear wheels slip first (slipping spin). A slip ratio S is calculated in accordance with the ratio of the front-wheel speed $N_F$ to the rear-wheel speed $NS_R$, $S = N_F/N_R(S > 0)$. The slip ratio S, a steering angle $\psi$, and a shift position signal from the sensors 93 and 100 are applied to a clutch pressure setting section 95. In accordance with the input signals, the clutch pressure setting section 95 retrieves a clutch pressure Pc from a clutch pressure look up table 96.

Figure 6:
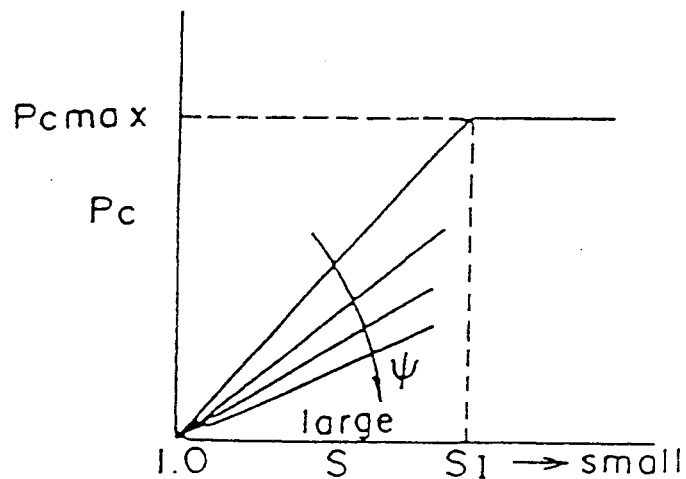
FIG. 6 is a graph showing a clutch pressure look-up table.

FIG. 6 shows clutch pressures stored in the look-up table 96. When the slip ratio S is $S \geq 1$, which means that the rear wheels 9L, 9R do not slip, the clutch pressure Pc is set to a small value. When the rear wheels slip and the slip ratio S becomes $S < 1$, the clutch pressure Pc (clutch torque) increases with a decrease of the slip ratio S. When the slip ratio S becomes smaller than a set value SI, the clutch pressure Pc is set to a maximum Pcmax. Further, when the steering angle $\psi$ increases, the clutch pressure Pc is decreased, thereby preventing tight corner braking.

The clutch pressure Pc is applied to a duty ratio providing section 97 where a duty ratio D corresponding to the derived clutch pressure Pc is provided. A duty signal with a duty ratio D provided at the section 97 is applied to the solenoid-operated duty control valve 87.

Figure 8:
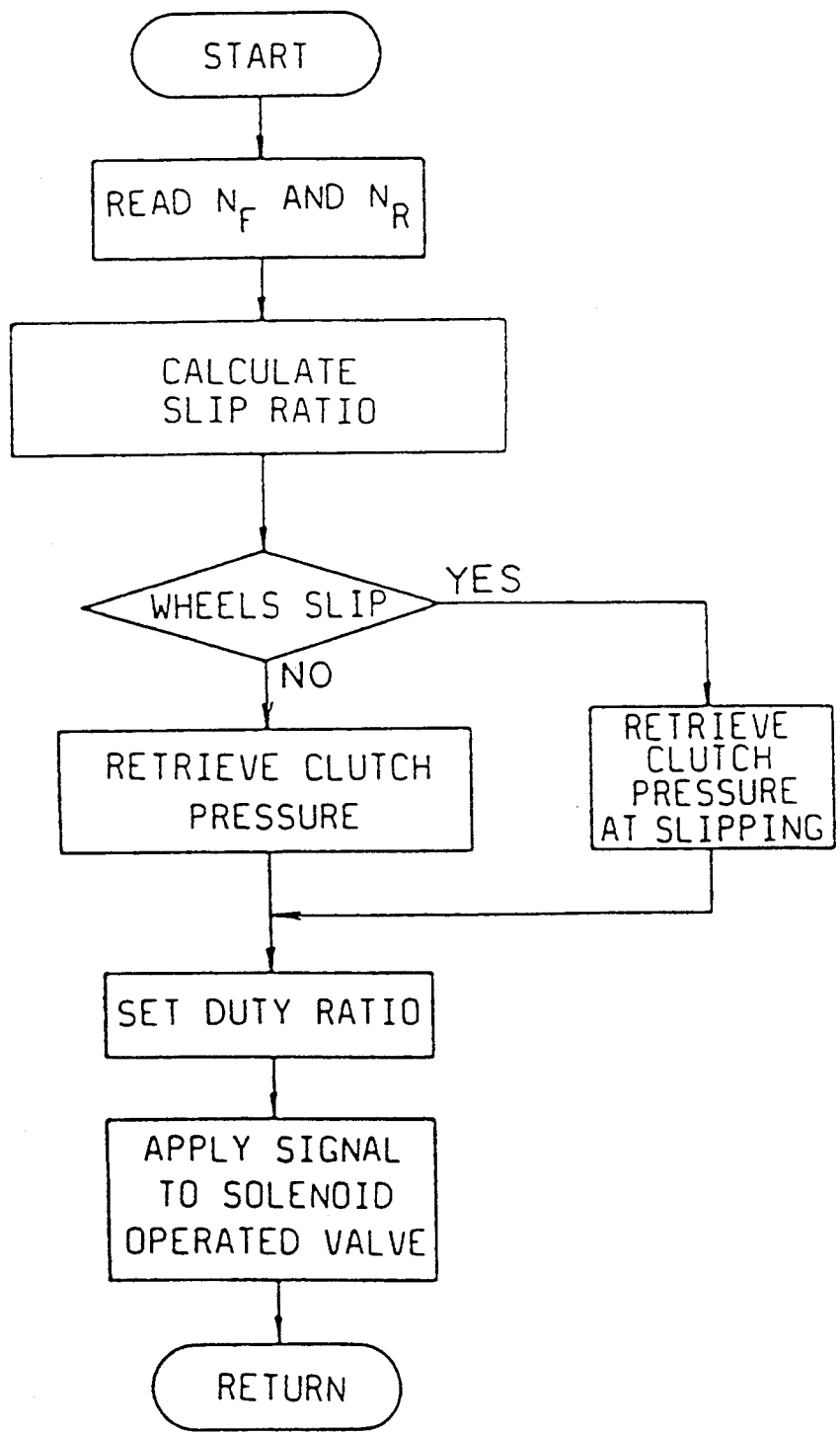
FIG. 8 is a flowchart showing an operation of a control unit in the control system.

FIG. 8 is a flowchart showing the operation of the control unit 90.

As aforementioned, the front-wheel speed $N_F$ and the rear-wheel speed $N_R$ are detected and slipping of the front wheels 5L, 5R and rear wheels 9L, 9R is calculated. If the slip ratio is smaller than the set value, a differential operation restricting clutch torque is derived from a look-up table 96 in accordance with a throttle opening degree, vehicle speed, a shift position and the steering angle ψ. The duty ratio corresponding to the derived clutch torque is applied to the solenoid-operated valve 87. When the slipping is larger than the set value, a clutch torque is derived from the look-up table 96 for operating the valve 87 at slipping.

Describing the operation of the system, the power of the engine 10 is transmitted through the clutch 13 to the manual transmission 30 at which the transmission ratio is controlled. The output of the transmission is transmitted to the first sun gear 51 of the central differential 50 through the output shaft 15, the drive gear 16, the final gear 17 and the input shaft 20. Since the rotational speed is increased through the gears 17 and 20a, the input torque to the central differential 50 is reduced. The front torque $T_F$ and the rear torque $T_R$ are determined in accordance with the radii of the gears of the central differential 50. The torque is transmitted to the carrier 55 at a ratio, for example 38% and to the second sun gear 53 at a ratio, for example 62%.

If no slip state is detected in the control unit 90 while the vehicle is driven on the dry road (S≧1), a signal corresponding to the duty ratio of 100% is applied from the duty ratio providing section 97 to the solenoid-operated duty control valve 87. Thus, the clutch control pressure becomes zero and the clutch control valve 82 operates to close the passage 81a, thereby draining the oil from the clutch 60. The clutch 60 is disengaged and the clutch torque becomes zero so as to render the central differential 50 free.

Accordingly, the torque of the carrier 55 is transmitted to the front wheels 5L and 5R through the drum 61 of the clutch 60, the second output shaft 21, shaft 25, front differential 40 and axles 4L and 4R at the ratio 38%. The torque at the distribution ratio of 62% is transmitted to the rear wheels 9L and 9R through the second sun gear 53, the first output shaft 22, the transfer shaft 71, the bevel gears 73 and 74, the rear drive shaft 75, the propeller shaft 6, the rear differential 7 and the rear axles 8L and 8R. Thus, a full-time four-wheel driving is established.

At the standard torque distribution ratio, the vehicle is driven under the understeering condition, so that good operability of the vehicle is ensured. Further, the vehicle smoothly negotiates a sharp corner due to the differential operation of the central differential 50.

Figure 7A:
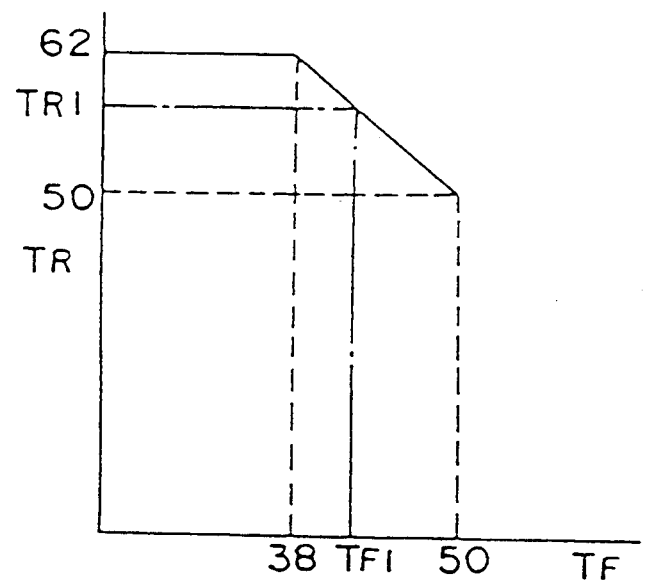
FIG. 7a is a graph showing a relationship between front torque and rear torque.
Figure 7B:
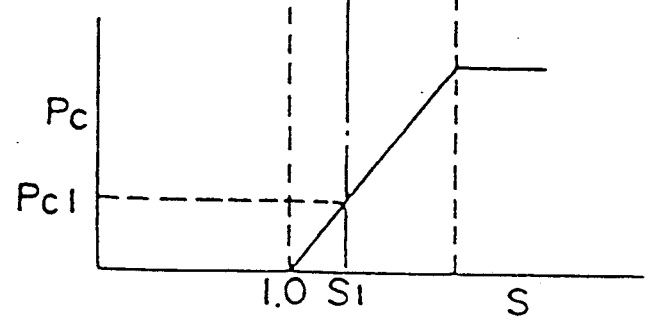
FIG. 7b is graph showing characteristics of a clutch pressure in accordance with a slip ratio.

If the vehicle is driven on a slippery road, the rear wheels 9L, 9R slip first because the larger amount of torque is distributed to the rear wheels 9L, 9R. The slip ratio $S_1$ is calculated at the slip ratio calculator 94 of the control unit 90. A duty signal corresponding to clutch pressure $Pc_1$ in accordance with the slip ratio $S_1$ (S<1) is applied to the solenoid-operated valve 87. The clutch control valve 82 is operated by the control pressure of oil obtained by regulating the line pressure at the solenoid-operated valve 87, so that the clutch 60 is engaged at the clutch pressure. Consequently, the clutch torque Tc is produced in the clutch 60. The clutch 60 is provided in parallel with the carrier 55 and the second sun gear 53 of the central differential 50. Accordingly, the clutch torque Tc is transmitted from the second sun gear 53 to the carrier 55 to increase the torque to the front wheels. Thus, the distribution ratio of the front torque and the rear torque $T_F:T_R$ becomes $T_{F1}:T_{R1}$, respectively, as shown in FIGS. 7a and 7b. To the contrary, the torque to the rear wheels 9L, 9R is reduced to eliminate slipping, thereby improving driveability to ensure good operability and safe driving.

When the slip ratio S becomes smaller than the set value SI, the differential operation restricting torque becomes maximum by the pressure of oil in the clutch 60. Thus, the carrier 55 is directly engaged with the second sun gear 53 to lock the central differential 50. Thus, the four-wheel driving is established in accordance with the torque distribution corresponding to the axle loads of the front and rear wheels. Thus, the torque distribution is continuously controlled in accordance with the slip condition for preventing the slipping of the wheels 5L, 5R, 9L, 9R.

When the vehicle makes a turn, the clutch torque of the clutch 60 is decreased in accordance with the steering angle ψ, so that the differential limit operation of the central differential 50 is decreased to sufficiently absorb the speed difference between the front and rear wheels, thereby preventing tight corner braking and ensuring good operability.

It will be noted that the standard torque ratio and the torque distribution ratios may be set to other values than the above-described embodiment.

Figure 9A:
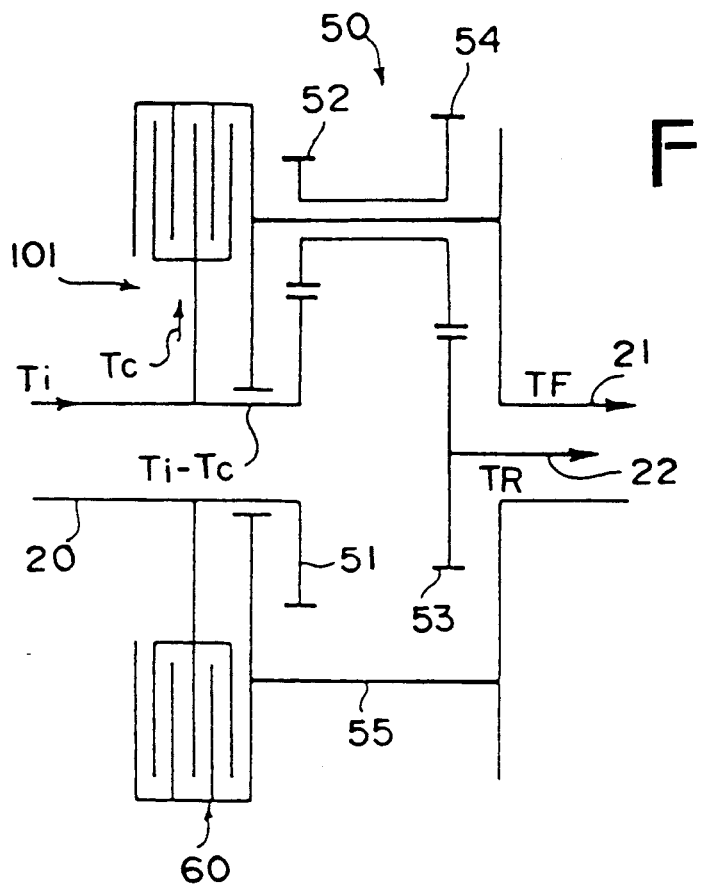
FIGS. 9a and 9b are schematic diagrams showing other examples of the central differential.

FIGS. 9a shows another example of the central differential. The fluid-operated multiple-disk clutch 60 is disposed between the carrier 55 and the input shaft 20 of the central differential 50. Thus, a bypass system 101 comprising the clutch 60 is provided for the transmitting system from the input shaft 20 to the first output shaft 22 and to the second output shaft 21 through the central differential 50. When the rear wheels 9L, 9R slip, the speed difference in the central differential 50 becomes:

rear-wheel speed $N_R$ > speed of input shaft 20 > front-wheel speed $N_F$.

A part of the input torque of the input shaft 20 is directly transmitted to the second output shaft 21 through the drive drum 61 of the clutch 60 and the carrier 55 in accordance with the clutch torque Tc. The remaining torque is transmitted to the first output shaft 22 from the first sun gear 51 through the first and second pinions 52 and 54 and the second sun gear 53. The front-wheel torque $T_F$ and the rear-wheel torque $T_R$ are as follows.

$$T_F = 0.38 (T_i - T_c) + T_c$$

$$T_R = 0.62 (T_i - T_c)$$

Since the clutch torque Tc is zero in the no slip state, the torque distribution ratio of the front and rear wheels is $T_F:T_R = 38:62$. When the rear wheels slip to produce clutch torque Tc, the input torque Ti proportional to the clutch torque Tc is directly transmitted to the front wheels 5L, 5R. The input torque Ti transmitted to the front wheels 5L, 5R becomes large with the increase of the clutch torque Tc.

Figure 9B:
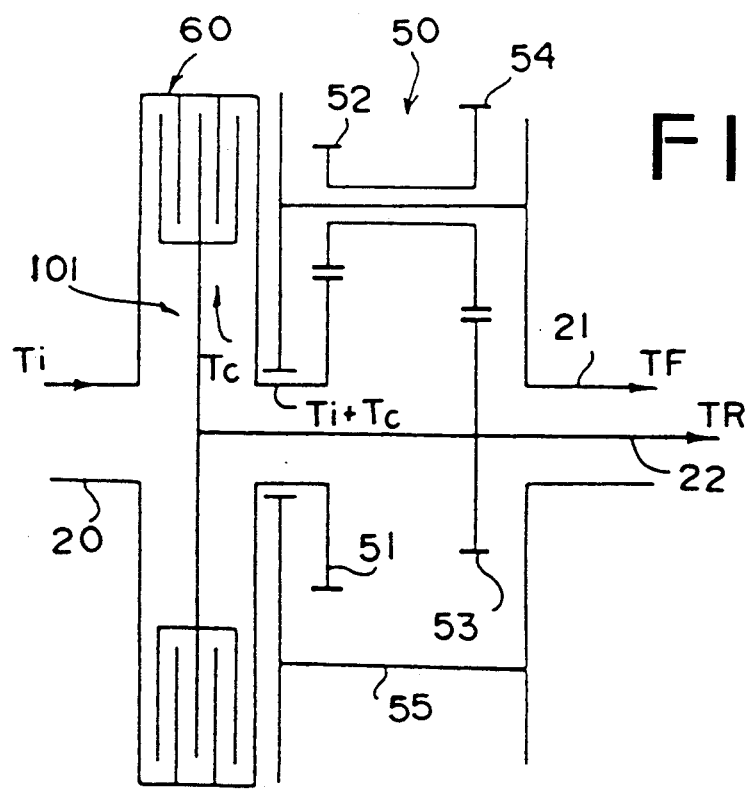

In the central differential of FIG. 9b, the input shaft 20 is provided with a transmitting member connected with the drum 61 of the clutch 60. The multiple-disk clutch 60 is disposed between the input shaft 20 and the first output shaft 22. Thus, the bypass system 101 comprising the clutch 60 is provided for the input shaft 20. The front-wheel torque $T_F$ and the rear-wheel torque $T_R$ are as follows.

$$T_F = 0.38 (T_i + T_c)$$

$$T_R = 0.62(T_1 - T_c) - T_c$$

When the rear wheels 9L, 9R slip, the torque corresponding to the sum of the clutch torque Tc and the input torque Ti is transmitted to the front wheels 5L, 5R.

The system of the present invention can be employed in a four-wheel drive motor vehicle of other types such as the type of the rear wheel drive vehicle with a rear engine.

In accordance with the present invention, the central differential comprises two pairs of sun gears and planetary pinions and a carrier. The standard torque distribution to front wheels 5L, 5R and the rear wheels 9L, 9R is determined by the radii of the pitch circles of the gears and the pinions. Thus, the torque distribution ratio can be set to various values.

Accordingly, a rigid and compact system may be made to distribute larger torque to the rear wheels 9L, 9R than that to the front wheels 5L, 5R, without changing the size of the system. Since large torque is transmitted to the rear wheels 9L, 9R, steerability is improved and the slipping of the wheels is accurately detected, thereby improving acceleration characteristics. In addition, wide controlling of the torque distribution can be performed. Thus, operability and driveability of the vehicle are accurately and properly controlled, thereby improving efficiencies thereof.

Since the central differential and the fluid-operated multiple-disk clutch are coaxially provided with the transfer shaft parallel to the front axles, a large space can be provided for the differential and the clutch. Thus, the central differential and the clutch can be arbitrarily disposed and the assemblage thereof is facilitated. The fluid-operated multiple-disk clutch has a sealed construction, so that a preferable lubricant for the clutch can be used.

The torque transmitted to the central differential can be decreased by increasing the speed of the input gear 20a. Accordingly, the central differential need not be extremely rigid, which enables reduction of the size thereof.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling torque distribution to front wheels and rear wheels of a motor vehicle having a laterally mounted engine and transmission, and a first differential coaxially mounted on either one set of front or rear wheel axles of the vehicle for differentiating speed between left and right of the wheels of the vehicle on a corresponding set of axles, the system comprising:
   a transfer device for transmitting torque to the other set of the rear or front wheel axles, said transfer device has a central transfer shaft;
   a central differential operatively connected between said transmission and said first differential and mounted on said transfer shaft for transmitting respective torque to said first differential and to said transfer shaft;
   said transfer shaft is spaced from and parallel to said one set of axles; and
   a final gear meshed with an output gear of the transmission for transmitting power of the engine to said central differential;
   said central differential comprises a planetary gear device comprising:
   a first sun gear coaxially and relatively rotatably mounted with respect to said transfer shaft and driven by said final gear;
   a second sun gear jointly rotatably connected with said transfer shaft; and
   a planetary gearing supported in a carrier and meshed with said first and second sun gears for differentiating speed between said front and rear wheels;
   a fluid-operated multiple-disk clutch connected to said carrier and mounted compactly and coaxially with respect to said transfer shaft for restricting differential operation of said planetary gear device; and
   control means for controlling said clutch for accurately distributing torque to each front and rear wheels of the vehicle at an optimum ratio in accordance with driving conditions of said vehicle.

2. The system according to claim 1, wherein said first sun gear is formed on an input shaft of said central differential, said input shaft meshes with said final gear.

3. The system according to claim 1, wherein said fluid-operated multiple-disk clutch is connected between said carrier and said first sun gear.

4. The system according to claim 1, wherein said fluid-operated multiple-disk clutch is connected between said carrier and said second sun gear.

5. The system according to claim 1, wherein said output gear is connected to a hub member of said first differential, said hub member has said final gear thereon.

6. The system according to claim 1, wherein said central differential has a first output shaft coaxially and jointly rotatably connected to said transfer shaft, and
said first sun gear is relatively rotatably mounted on said first output shaft and said second sun gear is formed on said first output shaft.

7. The system according to claim 1, wherein said central differential has a first output shaft coaxially and jointly rotatably connected to said transfer shaft, and
said clutch is mounted concentrically around and relatively rotatably to said first output shaft.

8. The system according to claim 1, wherein the planetary gear device is arranged with such a rear-deviated distribution that a larger torque than the torque to the front wheels is transmitted to the rear wheels, and clutch torque is controlled such that the torque distribution is changed between the rear-deviated distribution and the distribution corresponding to the axle loads of the front and rear wheels.

9. The system according to claim 8, wherein the control means comprises a hydraulic circuit for supplying pressurized oil to the fluid-operated multiple-disk clutch, and a control unit for controlling the pressure of oil supplied to the clutch.

10. The system according to claim 9, wherein the hydraulic circuit comprises
an oil pump, a pressure regulator valve for regulating the pressure of the oil supplied from the oil pump to produce a line pressure, a clutch control valve for controlling the oil supplied to the clutch, a solenoid-operated duty control valve for controlling the pressure of the oil supplied to the clutch control valve, the control unit comprises a slip ratio calculator for calculating slip ratio between the rear wheels and the front wheels in accordance with the ratio between the front-wheel speed and the rear-wheel speed, clutch pressure setting means responsive to the slip ratio for providing a clutch pressure, and duty ratio providing means responsive to the clutch pressure for producing pulses having a duty ratio corresponding to the clutch pressure to the duty control valve for controlling the pressure of oil.

11. A system for controlling torque distribution to front wheels and rear wheels of a motor vehicle having a laterally mounted engine and transmission, and a first differential coaxially mounted on either one set of front or rear wheel axles of the vehicle for differentiating speed between left and right of the wheels of the vehicle on a corresponding set of ales, the system comprising:

a transfer device for transmitting torque to the other set of the rear or front wheel axles, said transfer device has a central transfer shaft;

a central differential operatively connected between said transmission and said first differential and mounted on said transfer shaft for transmitting respective torques to said first differential and to said transfer shaft;

said transfer shaft is spaced from and parallel to said one set of axles; and a final gear meshed with an output gear of the transmission for transmitting power of the engine to said central differential;

said central differential comprises a planetary gear device comprising:

a first sun gear coaxially and relatively rotatably mounted with respect to said transfer shaft and driven by said final gear;

a second sun gear jointly rotatably connected with said transfer shaft; and a planetary gearing supported in a carrier and meshed with said first and second sun gears for differentiating speed between said front and rear wheels;

a fluid-operated multiple-disk clutch mounted compactly and coaxially with respect to said transfer shaft for restricting differential operation of said planetary gear device; and control means for controlling said clutch for accurately distributing torque to each front and rear wheels of the vehicle at an optimum ratio in accordance with driving conditions of said vehicle.

12. The system according to claim 11, wherein said fluid-operated multiple-disk clutch is connected between said first and said second sun gears.

13. The system according to claim 11, wherein said central differential has a first output shaft coaxially and jointly rotatably connected to said transfer shaft, and said clutch is mounted concentrically joined on said first output shaft.

* * * * *